US006833951B2

(12) United States Patent
Kolosowsky

(10) Patent No.: US 6,833,951 B2
(45) Date of Patent: Dec. 21, 2004

(54) SEAMLESS REAR PROJECTION SCREEN

(75) Inventor: Aleksandra Kolosowsky, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/751,357

(22) Filed: Dec. 29, 2000

(65) Prior Publication Data

US 2002/0085278 A1 Jul. 4, 2002

(51) Int. Cl.⁷ .......................... G03B 21/56; H04N 5/72; H04N 5/66; G02B 6/04; G02F 1/1333
(52) U.S. Cl. ...................... 359/460; 359/443; 359/449; 348/786; 348/804; 385/120
(58) Field of Search ................................ 359/460, 443, 359/449; 348/840, 786, 804; 423/277; 385/88, 120; 346/63, 159

(56) References Cited

U.S. PATENT DOCUMENTS

| | | | |
|---|---|---|---|
| 3,799,836 A | | 3/1974 | Rogers et al. |
| 4,573,082 A | * | 2/1986 | Jeskey .......................... 348/832 |
| 4,904,049 A | | 2/1990 | Hegg ........................ 350/96.27 |
| 5,181,130 A | * | 1/1993 | Hubby, Jr. ..................... 349/63 |
| 5,502,457 A | * | 3/1996 | Sakai et al. ..................... 345/87 |
| 5,543,870 A | | 8/1996 | Blanchard ..................... 353/74 |
| 5,544,268 A | | 8/1996 | Bischel et al. .................. 385/4 |
| 5,546,492 A | | 8/1996 | Ansley et al. ............... 385/116 |
| 5,594,561 A | | 1/1997 | Blanchard ..................... 349/59 |
| 5,626,410 A | * | 5/1997 | Chambers et al. ............. 353/94 |
| 5,664,032 A | | 9/1997 | Bischel et al. .................. 385/4 |
| 5,796,499 A | | 8/1998 | Wenyon |
| 5,912,997 A | | 6/1999 | Bischel et al. ................ 385/15 |
| 5,959,711 A | | 9/1999 | Silverstein et al. |
| 5,974,215 A | * | 10/1999 | Bilbro et al. ............... 385/116 |
| 6,078,704 A | | 6/2000 | Bischel et al. .................. 385/4 |
| 6,128,130 A | | 10/2000 | Zobel, Jr. et al. |
| 6,243,082 B1 | * | 6/2001 | Konishi ....................... 345/204 |
| 6,476,378 B2 | * | 11/2002 | Nougaret et al. ....... 250/227.11 |

FOREIGN PATENT DOCUMENTS

EP     1003145 A    5/2000

OTHER PUBLICATIONS

Tipler, Paul A. Physics, Jul. 1982, Worht Publishers, Inc. Second Edition, vol. 1 pp. 4–7.*
Adventures in Fiber Optics Kit by Industrial Fiber Optics, Inc. (pp. 9–10) 1998.*
Kolosovskaya, A.E., et al., "Minimal voltage–length product accessible in channel diffused waveguide electrooptic modulators in doped ferroelectrics", *Proceedings of the SPIE, International conference on Optical Information Processing, 2051*, pp. 855–860, (Aug. 1993).

* cited by examiner

Primary Examiner—David Gray
Assistant Examiner—Magda Cruz

(57) ABSTRACT

The present invention provides an optical faceplate made from fibrous crystals which are transparent, colorless and work as a coherent faceplate. The numeric aperture of a single fiber is within a range of about 0.20 to 0.66. A nonlimiting example of such a fibrous crystal is Ulexite (also known as "TV" rock). In one embodiment the present invention comprises an optical faceplate made of a fibrous crystal in lab-created, artificially grown form. In a further embodiment, an optical faceplate is made of crystals not found in nature, or not found in nature in fibrous form. In one embodiment the present invention provides a seamlessly tiled projection display comprising at least one fibrous crystal faceplate as a pre-screen in combination with a diffused rear projection screen. A faceplate made of fibrous crystals does not have a size limitation. In one embodiment, smaller plates of crystals may be seamlessly tiled into a larger plate, satisfying the need for a large projection screen. The projection display in accordance with the present invention is provided efficiently and at a low cost.

29 Claims, 4 Drawing Sheets

SEAMLESS REAR PROJECTION SCREEN

FIELD OF THE INVENTION

This invention relates to projection systems which "tile" multiple projector images on a rear projection screen, and more particularly to a cost effective method for high performance rear projection screen manufacturing and a seamless rear projection screen produced thereby.

BACKGROUND

Flat panel displays are commonly employed in lap-top, notebook or other portable computers in which packaging dimensions are of critical importance. In such applications, it is particularly important to keep the thickness of the display system to a minimum.

In prior display systems, minimum display thickness is obtained by employing a flat, minimum illumination source. The illumination source often comprises a flat fluorescent light system and a contiguous diffuser that are positioned adjacent to the rear surface of an active matrix liquid crystal module. The diffuser is utilized in an attempt to distribute light from the fluorescent source evenly over the liquid crystal module. In viewing the displayed image, the viewer effectively looks through the liquid crystal module at the diffused light source behind it.

With this method, it is very difficult to provide uniformity of brightness over a large surface area of the display. Further, because the viewer is effectively looking through the liquid crystal display at the diffuse light source behind it, light rays that pass through the liquid crystal display at an angle will traverse a longer path through the liquid crystal material than those that pass through at a normal to the display surface. This results in image contrast degradation.

A display system utilizing a collimated light source to illuminate a liquid crystal light valve (LCLV) and a rear projection diffusing screen in front of the LCLV to diffuse the light and control the field-of-view of the display system, particularly the use of collimated light to illuminate the LCLV, avoids the contrast problems discussed above. However, the display thickness must be at least as great as the projection screen width due to the need to collimate the illumination light before it reaches the LCLV. This limits the applicability of the display system to flat panel displays with relatively small screen sizes.

One way of overcoming this screen size limitation is to display the image as a set of individual smaller image portions that are displayed side-by-side in an array fashion on the rear projection screen. Each of the smaller image portions is created with separate small image sources, such as LCLV. This technique, known as "tiling", allows one to create a display system with an arbitrarily large screen size, while still employing a number of relatively small image sources. An example of tiling of images is shown at FIG. 1.

Seamless tiling of the rear-projected multiple images seems to be the most effective way to create a large area, high-resolution display. However, the properties of the diffused screen cause a directional non-uniform scatter (as shown at FIG. 2), so special solutions are required in order to reach seamlessness.

One problem with tiled systems is non-uniformity in brightness between the adjacent image portions on the projection screen when viewed either on or off-axis. This is because the brightness of an image that is diffused from a rear projection screen varies as a function of both the angle incidence that the image makes with respect to the projection screen, and the angle at which the observer views the image on the projection screen. Since each of the tiled images is incident on the screen at a different angle, and since an observer views each of them at a different viewing angle, the observer will perceive brightness differences between them.

The known solutions include a diffused screen with a large (up to 50%) degree of image overlap or combination of various pre-screens with diffused screen resulting in lesser or no image overlap. Referring to FIG. 3, one of the most effective pre-screens known is a fused fiber optic face plate FIG. 3, which works as a multiple channel spatial integration tube. Referring to FIG. 4, in combination with a diffused screen, a fiber optic faceplate simulates a Lambertian screen. Application of fused fiber optic face plate has been described in U.S. Pat. No. 5,626,410, incorporated herein by reference. Fused fiber optic faceplates are also commercially available from Schott Fiber Optics, Inc., InCom USA, Inc. and Collimated Holes, Inc. Manufacturing of a fused fiber optic faceplate is a highly labor consuming and expensive process. This state of the art has not had a commercial application because of a very high cost and limited sizes of the fused fiber optic faceplate available. The largest possible size is one square foot.

Fused fiber optic faceplates cannot be seamlessly tiled to produce a larger faceplate. "Dead" fibers on the boundaries of a fiber optic faceplate cause visible black seams on the boundary, which are apparent when a fiber optic faceplate is tiled with one or more additional faceplates. These visible black seams are shown in the photograph at FIG. 5.

Fused fiber optic faceplates cannot be combined to form a larger faceplate for use as a pre-screen because they cannot be seamlessly tiled. Therefore, there is a need for a faceplate which has no size limitations, and can be seamlessly tiled.

SUMMARY

In one embodiment, the present invention provides a seamlessly tiled projection display comprises at least one lab-created crystal faceplate as a pre-screen in combination with a diffused rear projection screen. In one embodiment multiple plates of crystals may be seamlessly tiled into a larger plate, satisfying the need for a large projection screen.

In one embodiment the optical faceplate is made from fibrous crystals which are transparent, colorless and work as a coherent faceplate. In one embodiment, the numeric aperture of a single fiber is within a range of about 0.20 to 0.66, depending upon the application of the optical faceplate. In one embodiment the crystals form as a conglomerate of aligned fibers which align in parallel, and possess a high transparency in the long dimension of the fibers. The crystals are environmentally stable and non-toxic. A nonlimiting example of such a fibrous crystal is Ulexite (also known as "TV" rock), found in abundance in nature. Examples of other minerals having similar qualities are Selenite, Artinite and Aragonite.

These minerals, in their naturally occurring form often have defects and impurities. Therefore, in one embodiment the present invention comprises an optical faceplate made of these minerals in lab-created, artificially grown form. In a further embodiment, an optical faceplate is made of crystals not found in nature, or not found in nature in fibrous form.

DETAILED DESCRIPTION

In the following detailed description, reference is made to the accompanying drawings, which form a part thereof, and in which is shown by way of illustration specific embodiments in which the invention may be practiced. These embodiments are described in sufficient detail to enable those skilled in the art to practice the invention, and it is to be understood that the embodiments may be combined, or that other embodiments may be utilized and that structural and logical changes may be made without departing from the spirit and scope of the present invention. The following detailed description is, therefore, not to be taken in a limiting sense, and the scope of the present invention is defined by the appended claims and their equivalents.

This document describes, among other things, an optical faceplate made of fibrous crystals, and a method for creating the faceplate. In one embodiment, the present invention provides a seamlessly tiled projection display comprising at least one faceplate made of fibrous crystals as a pre-screen in combination with a diffused rear projection screen. The optical faceplate is made of fibrous crystals which are transparent, colorless and work as a coherent faceplate. The fibrous crystals possess a "smart structure". In one embodiment, the numeric aperture of a single fiber is within a range of 0.2–0.66, depending on the application. The fibrous crystals form as a conglomerate of aligned fibers which align in parallel, and possess a high transparency in the long dimension of the fibers. The crystals are environmentally stable and non-toxic.

A nonlimiting example of such a fibrous crystal is Ulexite (also known as "TV" rock), found in abundance in nature. Examples of other minerals having similar qualities are Selenite, Artinite and Aragonite. While these minerals may be useful as fiber optic faceplates that are suitable for pre-screen applications, in their naturally occurring form these minerals often have defects and impurities. Such crystals will have too many defects and inclusions to be considered optical-grade materials. Therefore, in one embodiment the present invention comprises an optical faceplate made of these minerals in lab-created, artificially grown form. In a further embodiment, an optical faceplate is made of crystals not found in nature, or not found in nature in fibrous form.

Figure 1:
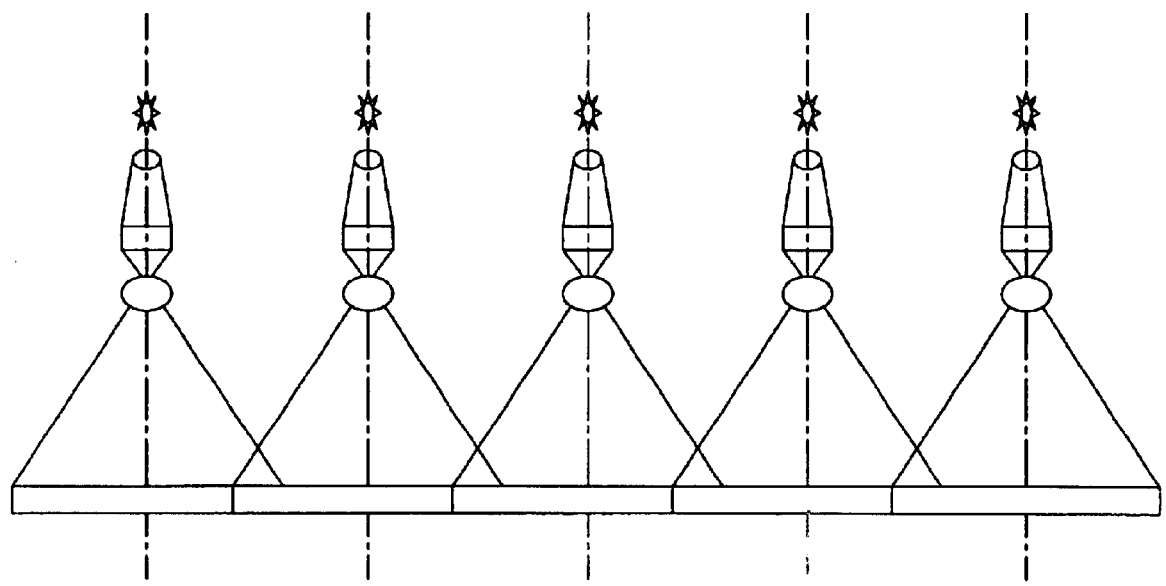
FIG. 1 is a diagram illustrating the basic principles of tiling.
Figure 2:
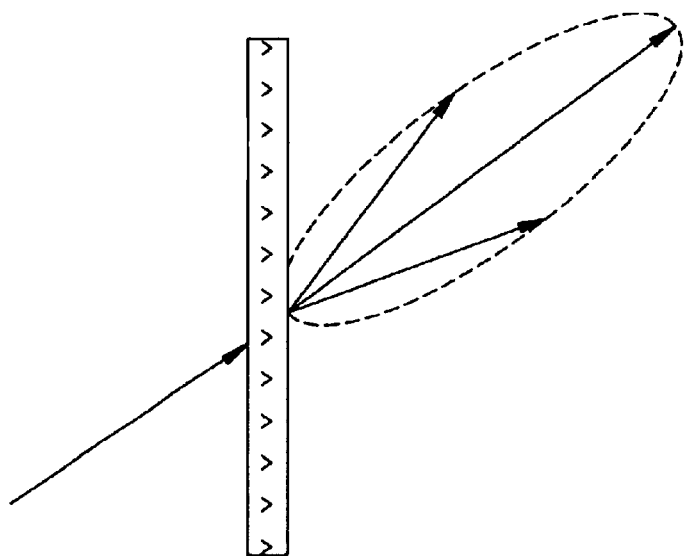
FIG. 2 is a diagram illustrating a fiber optic pre-screen.
Figure 3:
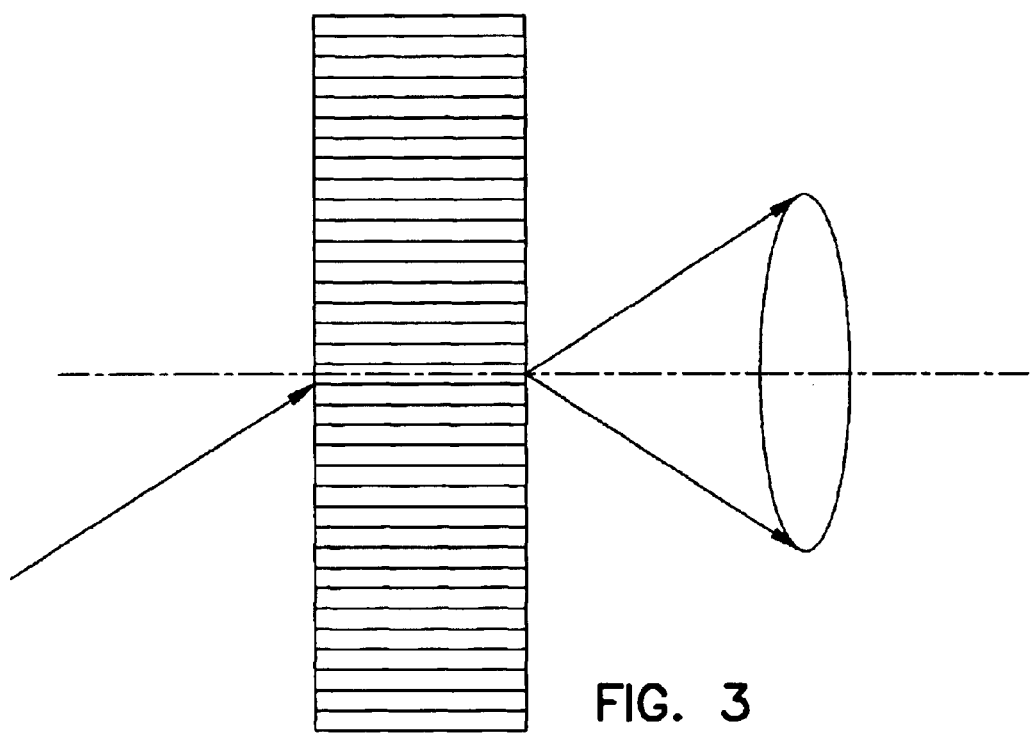
FIG. 3 is a diagram illustrating a fiber optic pre-screen.
Figure 4:
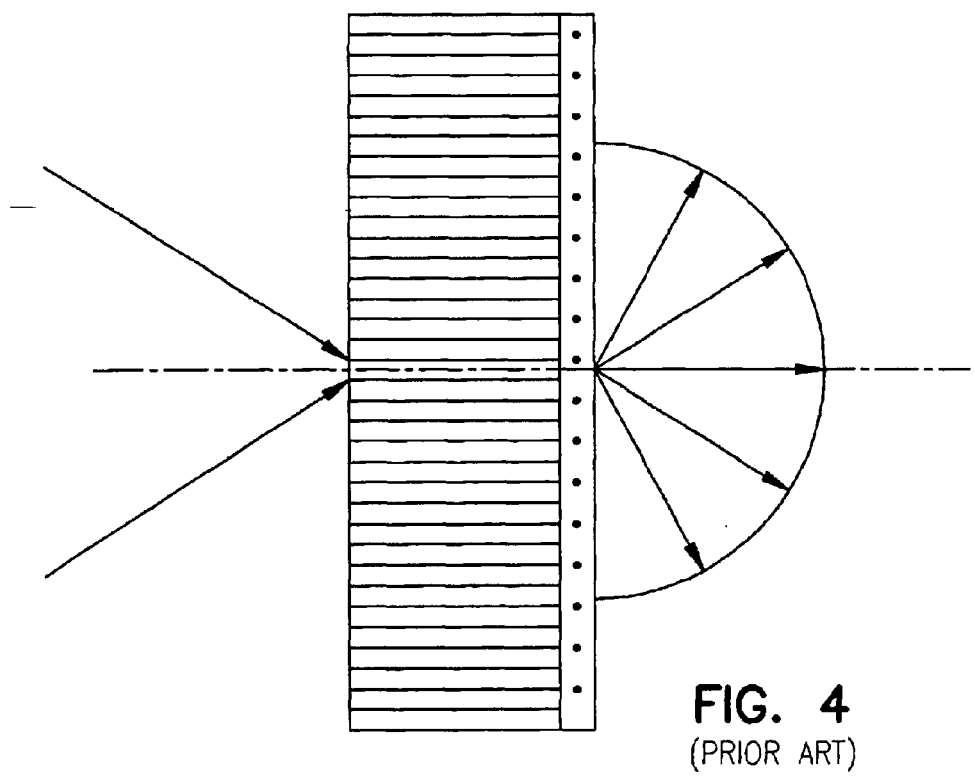
FIG. 4 is a diagram illustrating a fiber optic pre-screen.
Figure 5:
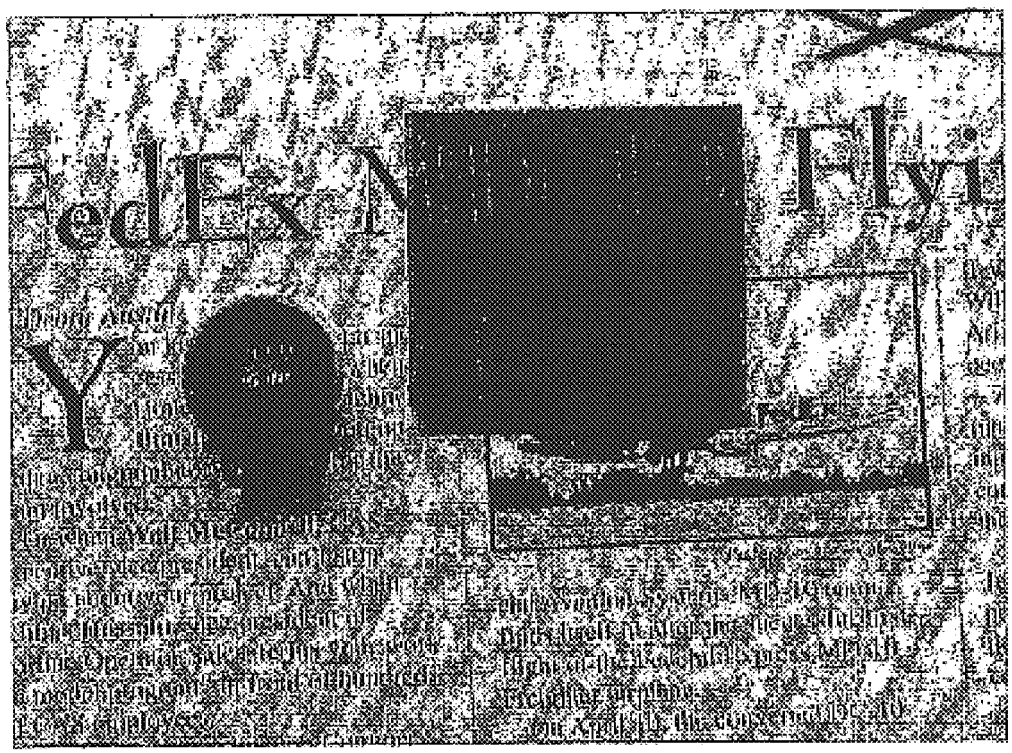
FIG. 5 is a view demonstrating defects of a prior art fiber optic faceplate.
Figure 6:
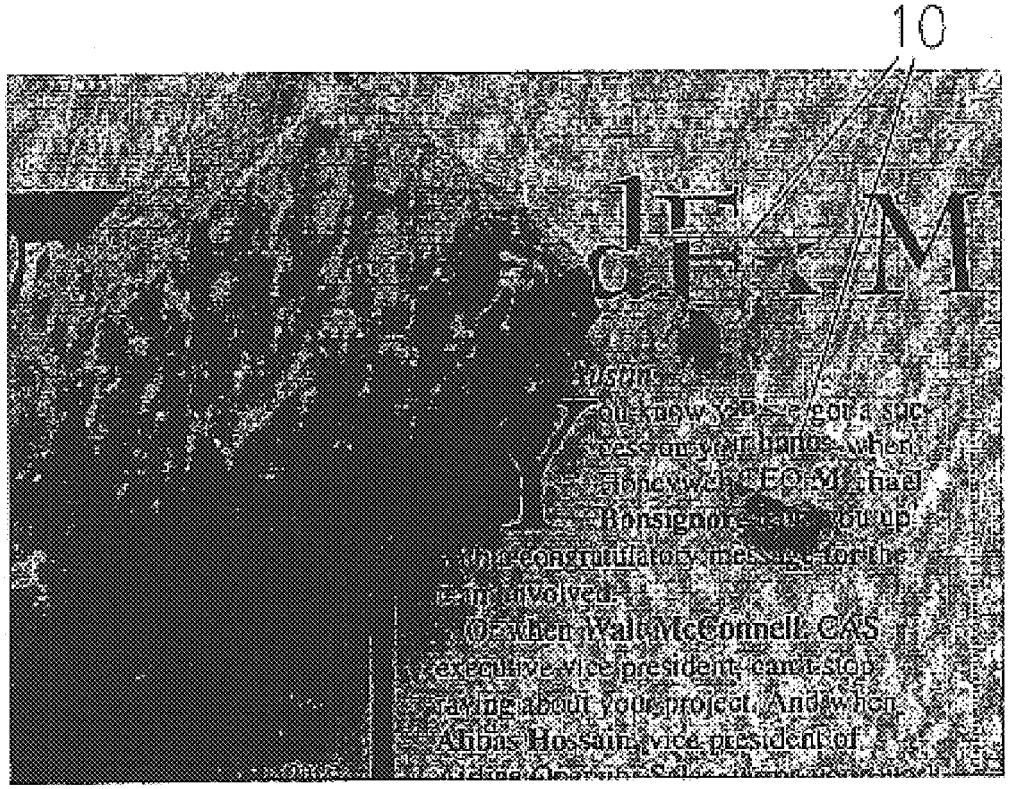
FIG. 6 is a view of a lab-created crystal in accordance with an embodiment of the present invention.

In one embodiment, an optical faceplate is provided made of fibrous crystals having the following properties. The fibrous crystals have a regular fibrous structure, and grow as a conglomerate of aligned fibers. The fibrous crystals are colorless and possess a high transparency in the long dimension of the fiber. An example of a bulk crystal is shown in FIG. 6. Inter-scatter between fibers is low. The fibers align strictly in parallel, so the image transfer is coherent. The refractive properties of the crystal will support a proper wave guiding effect. The numerical aperture of a single fiber is within a range of about 0.20–0.66, depending on the application of the faceplate. In one embodiment, for ambient light rejection purpose, the numerical aperture is in a range of from about 0.24 to 0.35. The crystals are environmentally stable, i.e. capable of existing in a stable form at a temperature range from about −20 to +70 degrees C. The crystals are non-poisonous, i.e. non-toxic. The shape of the fiber cross section does not have to be round, and the cross dimensions of separate crystalline fibers can be well below diffraction limit as they can work together as a fiber bundle. Referring again to FIG. 6, crystal faceplates 10 in accordance with the present invention are shown.

The method for growing the crystals depends on the nature of the crystal. For example, in one embodiment, the faceplate is made of crystals such as Ulexite or Quartz grown by a hydrothermal method at a relatively low temperature and pressure. In this method, crystals are grown from seed crystals in an oversaturated solution.

A nonlimiting example of an artificially grown crystal is Ulexite ($NaCaB_5O_9 8H_2O$). Ulexite is a natural mineral which is non-toxic and colorless. It has a hardness of 2.5 and a density of 1.95. Ulexite, also referred to as "TV Rock", is a biaxial optical positive crystal having a triclinic structure. Its refractive indices are (alpha)=1.49, (beta)=1.504 and (gamma)=1.520. Ulexite has the properties of a coherent fiber-optic faceplate along the c-axis, NA 0.3 (about 35 degree angular aperture in the air). In one embodiment of the present invention Ulexite may be grown from a stoichiometric mixture of $Na_2O$, $CaO$, $B_2O_3$, $H_2O$, all of which are very inexpensive components. Alternatively, Ulexite may be grown in a lab by recrystallization of natural Ulexite.

Crystals grown in a controlled environment can be doped, which may create an opportunity to change the parameters of the crystal lattice. The optical properties of the crystal, including refractive index and aperture, resolution and the electro-optical constant of the crystal are thereby changed. The influence of dopant on electro-optical interaction is discussed in *Minimal Voltage-Length Product Accessible in Channel-Diffused Waveguide Electro-Optic Modulators in Doped Ferroelectrics*", Kolosovskaya, A. E., Zilling, C. C., Proc. SPIE Vol. 2051, pp. 855–860, International Conference on Optical Information Processing (1994), incorporated herein by reference. Further, the structure can be layered, i.e. a gradient of properties or a steep change of properties along the vertical axis can be achieved by changing the concentration of dopant during the growth.

Lab-created crystals according to the present invention are versatile. In one embodiment, they may be made of virtually any size as there is no size limitation. They may be grown in large sheets on a substrate. In one embodiment, separate sheets may be stacked together or tiled without a visible seam. A faceplate made of fibrous crystal in accordance with the present invention would have a pitch or fiber size on a scale of nanometers and therefore would produce no visible seam. A fibrous crystal faceplate in accordance with one embodiment the present invention may be seamlessly tiled, unlike faceplates of glass which have a pitch on a micron scale and cannot be tiled without producing a visible seam.

Figure 7:
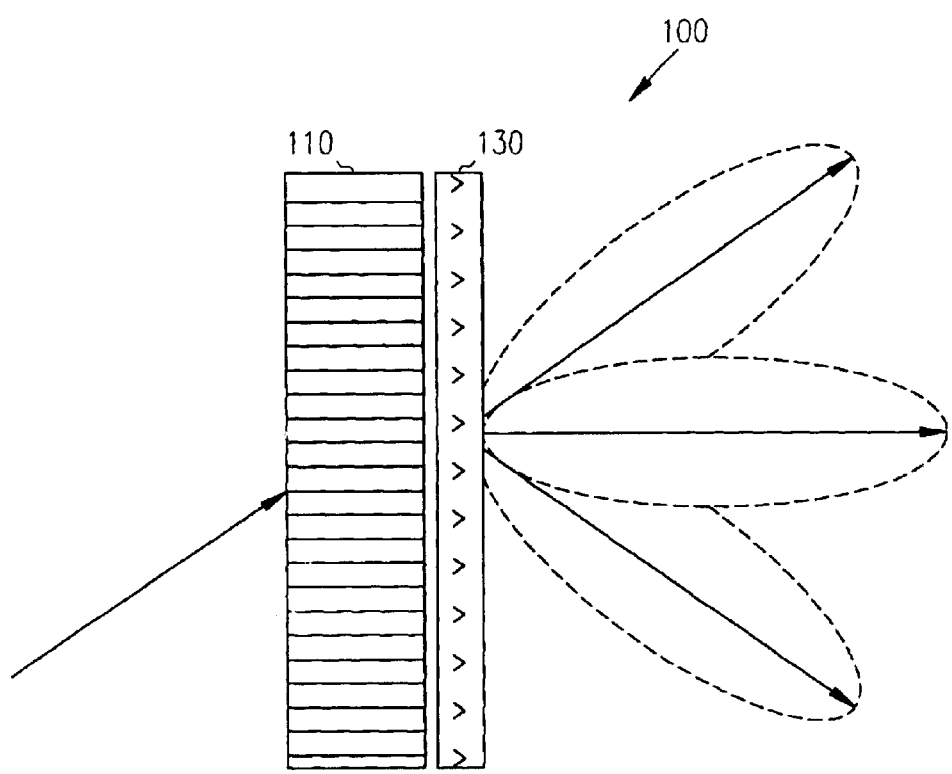
FIG. 7 is a diagram illustrating the diffusion properties of a rear projection screen constructed in accordance with the present invention.

Referring to FIG. 7, the present invention in one embodiment provides a projection display 100 comprising a pre-screen having at least one lab-created crystal faceplate 110, in combination with a diffused rear projection screen 130. In one embodiment, the display further includes an anti-reflection coating on a viewing side of the diffused rear projection screen. In one embodiment, the present invention may provide a seamlessly tiled projection display efficiently and at a lower cost than prior projection displays.

In a further embodiment, the present invention provides faceplate 10 made of lab-grown crystal material, as shown at FIG. 6.

In one embodiment, the present invention provides a fibrous crystal material for use as image intensifiers, field flatteners, as liquid crystal light valves (LCLVs), as CCD arrays, for X-ray imaging, as CRT displays and for remote viewing. The fibrous crystal faceplate in accordance with the present invention can integrate the function of a faceplate and a substrate for CCD arrays.

The present invention provides a solution which provides all of the advantages of a fused fiber optic pre-screen, such as seamless image with no overlap and ambient light rejection, for much lower cost. A faceplate made of such crystals does not have a size limitation. In one embodiment, multiple plates of crystals may be seamlessly tiled into a larger plate, satisfying the need for a large projection screen.

Advantages of a faceplate made of fibrous crystal material in accordance with the present invention would include lower price, higher resolution, higher transmittance, lower weight, and ease of processing. In one embodiment, the lab-grown crystal may also be dispersion-free. A faceplate made of such crystals does not have a size limitation. In on embodiment, smaller plates of crystals may be seamlessly tiled into a larger plate, satisfying the need for a large projection screen. These and other features and advantages of the invention will be apparent to those skilled in the art.

CONCLUSION

The above described invention provides, among other things an optical faceplate made of fibrous crystal, a method for creating the faceplate, and a projection display comprising at least one fibrous crystal faceplate as a pre-screen of unlimited size in combination with a diffused rear projection screen. In one embodiment the fibrous crystal may be lab-created. In one embodiment, the projection display may be seamlessly tiled and comprise multiple faceplates.

The above description is intended to be illustrative, and not restrictive. Many other embodiments will be apparent to those of skill in the art. The scope of the invention should therefore be determined with reference to the appended claims, along with the full scope of equivalents to which such claims are entitled.

What is claimed is:

1. A projection screen for displaying an image from an image source, the screen comprising:
   a first diffusing assembly including a pre-screen comprising a plurality of optical faceplates of fibrous crystal tiled without a visible seam; and
   a second diffusing assembly comprising a diffused rear projection screen, the faceplate being positioned to receive an image from the image source and to further diffuse said image.

2. The screen of claim 1 further including an anti-reflection coating on a viewing side of said projection screen.

3. The screen of claim 1 wherein the optical faceplate is made from fibrous crystals selected from the group consisting of crystals not found in nature, and crystals not found in nature in fibrous form.

4. The screen of claim 1 wherein the optical faceplate is made from crystals selected from the group consisting of artificially grown crystals and synthesized crystals which do not exist in nature.

5. The screen of claim 1 wherein the optical faceplate is made from a material having fibrous crystals which are transparent, colorless, work as a coherent faceplate, and comprise fibers having a numeric aperture of about 0.2.

6. The screen of claim 5 wherein the material is selected from the group consisting of Ulexite, Selenite, Artinite and Aragonite.

7. The screen of claim 5 wherein the optical faceplate is made of lab-grown Ulexite ($NaCaB_5O_9 8H_2O$).

8. The screen of claim 1 wherein the fibrous crystal has a fiber size on a scale of nanometers.

9. The screen of claim 1 wherein the fibrous crystal has a pitch significantly less than that of glass.

10. The screen of claim 1 wherein the fibrous crystal includes a dopant.

11. The screen of claim 1 wherein the Ulexite is recrystallized natural Ulexite.

12. A projection system for displaying an image, comprising:
    a first diffusing assembly including a pre-screen comprising a plurality of optical faceplates of fibrous crystal tiled without a visible seam;
    a second diffusing assembly comprising a diffused rear projection screen, the faceplate being positioned to receive an image from the image source and to further diffuse said image; and
    an image source for transmitting an image to the tiled optical faceplates.

13. The system of claim 12 wherein the image source is positioned so as to transmit the image directly to the plurality of tiled optical faceplates.

14. The system of claim 12 wherein the image source includes a plurality of overlapping light sources.

15. The system of claim 12 wherein the image source includes a device selected from the group consisting of image intensifiers, field flatteners, liquid crystal light valves (LCLVs), CCD arrays, X-ray imaging devices, CRT displays, and remote viewers.

16. The system of claim 12 wherein the image source includes a collimated light source.

17. The system of claim 12 wherein the fibrous crystal has a fiber size on a scale of nanometers.

18. The system of claim 12 wherein the fibrous crystal has a pitch significantly less than that of glass.

19. A projection screen for displaying an image from an image source, the screen comprising:
    a first diffusing assembly including a pre-screen comprising a plurality of tiled optical faceplates of fibrous crystal; and
    a second diffusing assembly comprising a diffused rear projection screen, the faceplate being positioned to receive an image from the image source and to further diffuse said image.

20. The screen of claim 19 wherein the optical faceplate is made from a material having fibrous crystals which are transparent, colorless, work as a coherent faceplate, and comprise fibers having a numeric aperture of about 0.2.

21. The screen of claim 20 wherein the material is selected from the group consisting of Selenite, Artinite and Aragonite.

22. The screen of claim 20 wherein the optical faceplate is made of lab-grown Ulexite ($NaCaB_5O_9 8H_2O$).

23. The screen of claim 22 where the optical faceplate is doped so as to change its optical properties.

24. The screen of claim 22 where the optical faceplate has a gradient of properties along a vertical axis thereof.

25. The screen of claim 24 where the optical faceplate is layered.

26. The screen of claim 24 where the optical faceplate has a steep change of properties along a vertical axis thereof.

27. A projection system for displaying an image, comprising:
- a first diffusing assembly including a pre-screen comprising a plurality of tiled optical faceplates of fibrous crystal;
- a second diffusing assembly comprising a diffused rear projection screen, the faceplate being positioned to receive an image from the image source and to further diffuse said image; and
- an image source for transmitting an image to the tiled optical faceplates.

28. The system of claim 27 wherein the fibrous crystal has a fiber size on a scale of nanometers.

29. The system of claim 27 wherein the fibrous crystal has a pitch significantly less than that of glass.

* * * * *